United States Patent [19]

Hackstie et al.

[11] Patent Number: 5,161,951
[45] Date of Patent: Nov. 10, 1992

[54] APPARATUS AND METHOD FOR PREVENTING AXIAL MOVEMENT OF A DISC ALONG A SHAFT

[75] Inventors: Louis F. Hackstie, Lake Mary; Lowell M. Swartz, Winter Springs, both of Fla.

[73] Assignee: Westinghouse Electric Corp., Pittsburgh, Pa.

[21] Appl. No.: 740,353

[22] Filed: Aug. 5, 1991

[51] Int. Cl.$^5$ ............................................. F01D 5/02
[52] U.S. Cl. .............................. 416/204 A; 403/261; 403/DIG. 7
[58] Field of Search ................. 403/261, 326, DIG. 7; 416/204 A, 244 A; 74/446, 447

[56] References Cited

U.S. PATENT DOCUMENTS

| | | | |
|---|---|---|---|
| 3,853,413 | 12/1974 | Parran | 403/326 |
| 4,288,172 | 9/1981 | Livesay et al. | 403/326 |
| 4,405,251 | 9/1983 | Kolchinsky et al. | 403/326 |
| 4,892,432 | 1/1990 | Cooper | 403/326 |

FOREIGN PATENT DOCUMENTS 2030738  12/1970  Fed. Rep. of Germany ...... 403/326

OTHER PUBLICATIONS

D. Oeynhausen et al., "Reliable Disk-Type Rotors for Nuclear Power Plants", *Proceedings of the American Power Conference*, (1987).

*Primary Examiner*—Edward K. Look
*Assistant Examiner*—Michael S. Lee

[57] ABSTRACT

An apparatus and method are provided for preventing axial movement of a disc along the shaft on which it is shrunk. The apparatus features a set of arcuate retainers having one portion disposed in a circumferentially extending groove in the disc face and another portion disposed in a circumferentially extending groove in the shaft outer surface. The retainers are installed by inserting them one at a time into an entry slot in the disc adjacent the groove. The last retainer is a locking retainer and is attached to a closure piece by locking screws threaded into two holes drilled at the intersection between the closure piece and locking retainer so that one half of the circumference of the hole is formed in the closure piece and the other half of the circumference of the hole is formed in the locking retainer.

23 Claims, 5 Drawing Sheets

APPARATUS AND METHOD FOR PREVENTING AXIAL MOVEMENT OF A DISC ALONG A SHAFT

BACKGROUND OF THE INVENTION

The current invention relates to the rotor of a turbomachine, such as steam turbine. More specifically, the current invention relates to an apparatus and method for preventing axial movement of a disc shrunk on the shaft of a steam turbine rotor.

The rotor of a steam turbine is typically comprised of a shaft having a plurality of blades affixed to its periphery. In addition, the shaft also features a disc, referred to as a "dummy" disc, which is unbladed. In one design, the dummy disc is shrunk onto the shaft so that it is held by an interference fit and radial pins near the downstream face. The dummy disc induces an axial force on the rotor which serves to balance the thrust which the steam expanding through the blading imposes on the rotor. As a result of differential thermal expansion between the disc and the shaft, as well as the centrifugal force on the disc, the interference fit holding the disc onto the shaft is reduced during operation. Temperature causes the disc to elongate upstream away from the pins. The interference fit then becomes tighter on the upstream face because the disc becomes umbrella-shaped due to the downstream face being hotter than the upstream face. Upon shutdown, the disc tends to thermally shorten, thus pulling on the pins while clinging to the rotor on the upstream face. Consequently, the dummy disc has a tendency to ratchet along the shaft during start-stop cycles. Such axial movement of the disc can result in the disc interfering with the stationary components attached to the steam turbine casing.

In the past, radially oriented retaining pins, which extended through holes in the dummy disc and the shaft, were used to prevent axial movement of the dummy disc along the shaft. However, the pins have not been entirely successful in restraining the discs and inspection has shown that, in some rotors, the dummy disc has moved axially as much as 0.150 cm (0.060 inch). Such axial movement has been accompanied by severe deformation of the radial pins, indicating that the pins lacked sufficient shear area to withstand the axial forces tending to move the disc.

Accordingly, it would be desirable to develop an apparatus having a large amount of shear area for preventing axial movement of a shrunk-on disc along a shaft. In addition, it would be desirable to provide a method of retro-fitting such an apparatus onto an existing steam turbine rotor. Moreover, since it is thought that differential motion between the disc and rotor at the upstream face of the disc must be eliminated to prevent the ratcheting motion of the disc, it would be desirable to retain the disc at its upstream face.

SUMMARY OF THE INVENTION

It is an object of the current invention to provide an apparatus and method for preventing axial movement of a disc along a shaft.

It is another object of the current invention that the apparatus have sufficient shear area to withstand large axial forces without significantly weakening or raising the operating stress in the disc.

It is still another object of the current invention that the apparatus retain the disc at its upstream face.

It is yet another object of the current invention to provide a method for retro-fitting the apparatus onto an existing steam turbine rotor and that the apparatus not extend significantly beyond the envelope of the existing rotor.

These and other objects are accomplished in a steam turbine having a casing containing a plurality of stationary vanes and a shaft enclosed by the casing. A first circumferentially extending groove is formed in the periphery of the shaft. A disc having a hub encircles the shaft in the vicinity of the first groove. A second circumferentially extending groove is formed in the hub. A plurality of arcuate retainers, each of which has first and second portions, are utilized for preventing axial motion of the disc relative to the shaft. The second portion of each of the retainers extends axially and is disposed in the second groove. The first portion extends radially inward from the second portion and is disposed in the first groove.

A retainer entry slot is formed on the second groove, the combined radial height of the entry slot and the second groove being at least as great as the radial height of each of the retainers. A closure piece is disposed in the entry slot for preventing circumferential motion of the retainers within the first and second grooves. At least one of the retainers is a locking retainer and is disposed inboard—that is, radially inward—of the entry slot, the combined radial height of the second portion of the locking retainer and the closure piece being substantially equal to the combined radial height of the entry slot and the second groove. A threaded hole is formed between the closure piece and the locking retainer, a first portion of the circumference of the hole being formed in the closure piece and a second portion of the circumference of the hole being formed in the locking retainer. An axially oriented locking screw is threaded into the hole for preventing axial motion of the closure piece and for locking the closure piece to the locking retainer.

DESCRIPTION OF THE PREFERRED EMBODIMENT

Figure 1:
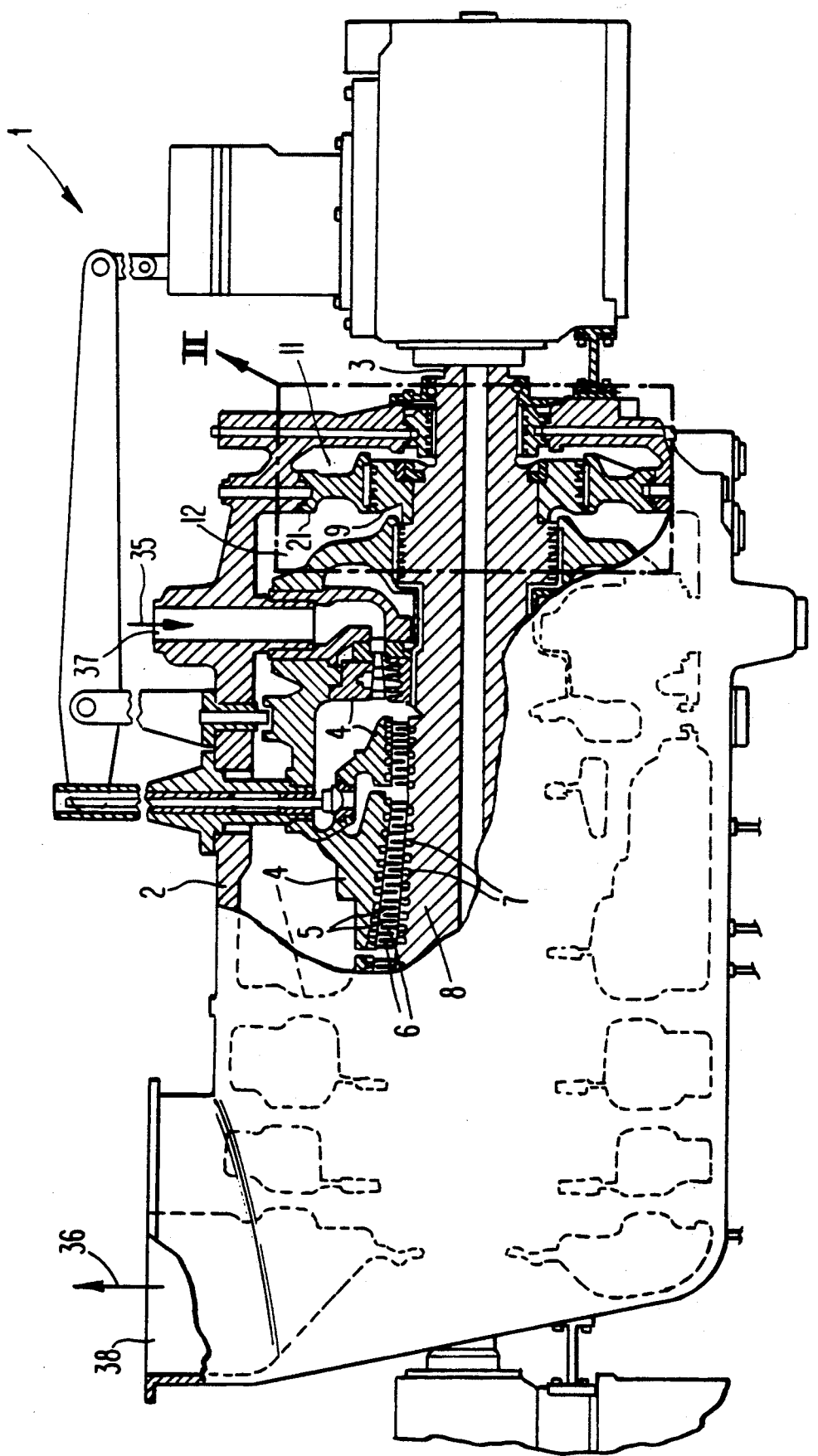
FIG. 1 is a longitudinal cross-section through a high pressure steam turbine.

There is shown in FIG. 1 a longitudinal cross-section through a high pressure steam turbine 1. The primary components of the steam turbine 1 are a stationary casing assembly 2 and a centrally disposed rotor 3 enclosed therein. The casing assembly 2 is comprised of a plurality of blade rings 4 affixed to the casing and a plurality of a stationary vanes 5 affixed to each of the blade rings 4. The rotor 3 is comprised of a shaft 8 into which a plurality of grooves 7 have been machined. A plurality of rotating blades 6 are disposed in each of the grooves 7. High pressure steam 35 enters the high pressure steam turbine 1 through an inlet 37 formed in the casing 2. After flowing through each stage of rotating blades 6 and stationary vanes 5, the steam 36, now at a reduced pressure, exits the high pressure steam turbine 1 through an outlet 38 formed in the casing 2.

Figure 2:
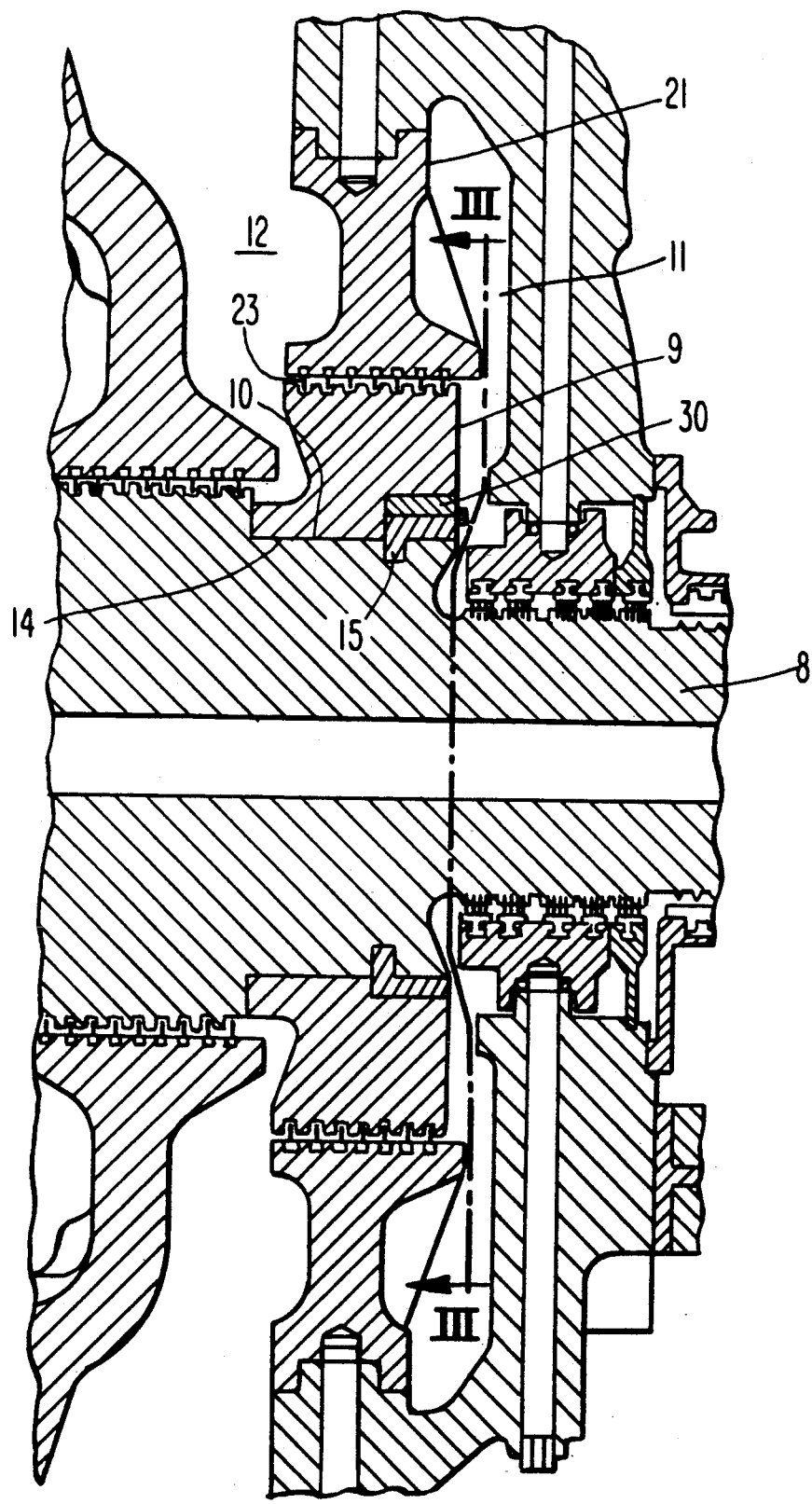
FIG. 2 is a detailed view of the portion of FIG. 1 indicated by the square marked II.

As shown best in FIG. 2, a dummy disc 9 is shrunk onto the shaft 8. A ring 21 attached to the casing 2 forms a front cavity 11 and a rear cavity 12 around the dummy disc 9. The steam supply system (not shown) to the cavities is such that the rear cavity 12 is supplied with higher pressure steam than the front cavity 11. As a result of the pressure differential between cavities 11 and 12, a net axial force is induced on the dummy disc 9 which acts in the upstream direction. This axial force tends to offset the thrust load which is imposed on the rotor 3 as a result of the decrease in steam pressure as the steam flows through the turbine and which acts in the downstream direction. Thus, the dummy disc 9 acts as a thrust balancing device. Communication between cavities 11 and 12 is inhibited by seals 23 which are retained in the ring 21 and encircle the dummy disc 9.

As shown in FIG. 2, the inner surface of the dummy disc 9 forms a hub 10. As initially machined, the inside diameter of the hub 10 is less than the outside diameter of the shaft surface 14 which the disc hub encircles. Thus, when the dummy disc 9 is shrunk onto the shaft 8, an interference fit retains the dummy disc on the shaft 8. As previously discussed, this interference fit is not sufficient to prevent gradual axial movement of the dummy disc 9 along the shaft 8 in the upstream direction. According to the current invention, motion in the upstream direction is prevented by a plurality of arcuate retainers 15, as explained further below.

Figure 3:
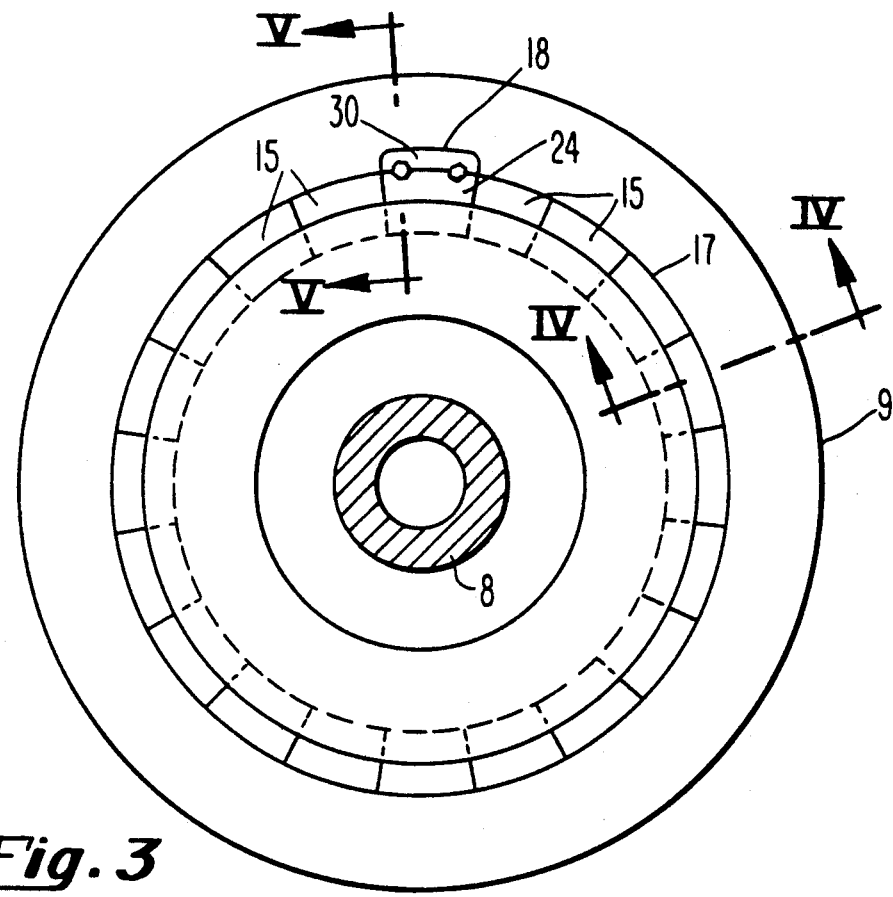
FIG. 3 is a cross-section through line III—III shown in FIG. 2.
Figure 4:
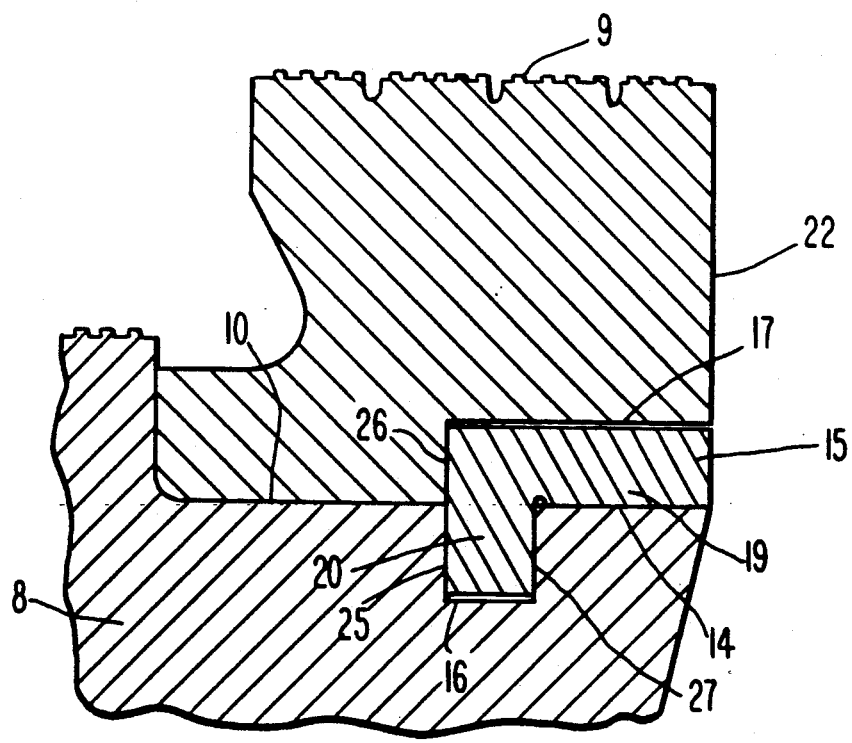
FIG. 4 is a cross-section through line IV—IV shown in FIG. 3.

As shown in FIGS. 3 and 4, a circumferentially extending groove 17 is formed in the upstream radially extending face 22 of the dummy disc 9 in the area where the face 22 intersects the hub 10. A second circumferentially extending groove 16 is formed in the outer surface 14 of the shaft 8. The grooves 16 and 17 are axially aligned so that the downstream radially extending walls 25 and 26 of the grooves 16 and 17, respectively, lie in the same radially extending plane. A plurality of retainers 15 are disposed in grooves 16 and 17. As shown in FIG. 3, each retainer 15 is an arcuate member. As shown in FIG. 4, each retainer is comprised of a substantially axially extending portion 19 and a substantially radially extending portion 20 so that the cross-sectional shape of each retainer forms an "L", portions 19 and 20 forming the first and second legs of the "L". Retainer portion 19 is disposed in the dummy disc groove 17 and portion 20 is disposed in the shaft groove 16. Thus, upstream axial movement of the dummy disc 9 is prevented by having the wall 26 of the disc 9 bear against the portion 20 of the retainer 15 which, in turn, bears against wall 27 of the shaft groove 16.

In the preferred embodiment, the grooves 16 and 17 extend 360° around the disc 9 and shaft 8, respectively. As shown in FIG. 3, each retainer 15 encompasses a relatively small arc. Accordingly, a sufficient quantity of retainers 15 are employed so that the combined arcs encompassed by all of the retainers fills the entire 360° of the grooves 16 and 17. Thus, the combined shear area of all of the retainer portions 20 is sufficient to withstand a very large axial force.

Figure 5:
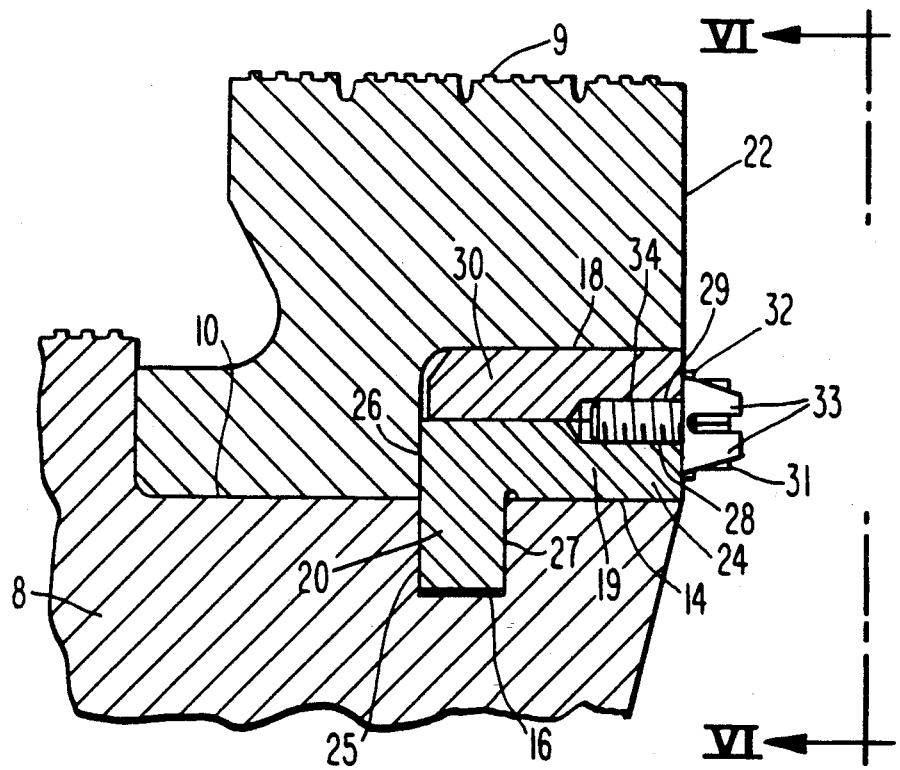
FIG. 5 is a cross-section through line V—V shown in FIG. 3.

As shown in FIGS. 3 and 5, a localized portion of the groove 17 is enlarged in the radial direction to form an entry slot 18. The combined radial height of the entry slot 18 and groove 17 is at least as great as the radial height of the retainers 15 so that the entry slot allows the retainers to be axially inserted into groove 17. The last retainer 15 installed in the grooves 16, 17 is a special locking retainer 24, shown best in FIG. 8. The locking retainer 24 is identical to the other retainers 15 except for the addition of the portions 28 of two threaded holes, as discussed further below. A closure piece 30 is disposed in the entry slot 18 adjacent and radially outboard of the locking retainer 24. The radial thickness of the closure piece 30 is such that it fits snugly into the entry slot 18, so there is essentially no radial clearance between the disc outer surface 14 and the outboard surface of the entry slot 18.

Figure 7:
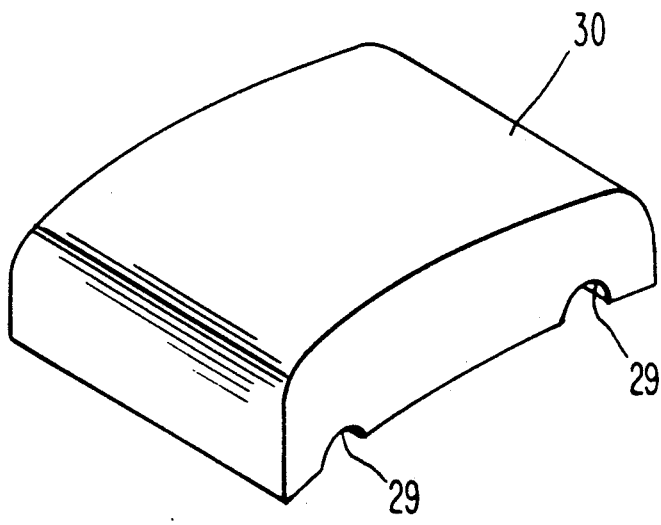
FIG. 7 is an isometric view of the closing piece shown in FIG. 5.
Figure 8:
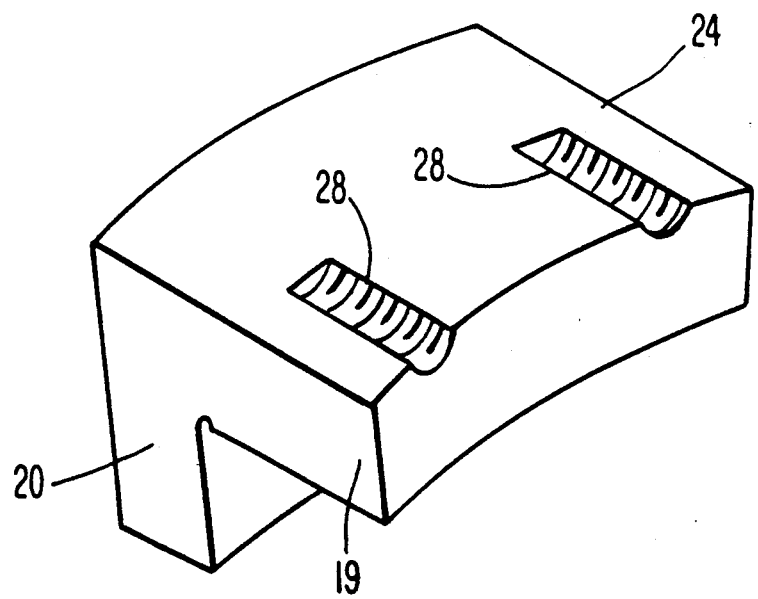
FIG. 8 is an isometric view of the locking retainer shown in FIG. 5.

As shown in FIG. 7, one half 29 of the circumference of two threaded holes 34 are formed in the inboard surface of the closure piece 30. As shown in FIG. 8, the other half 28 of the circumference of the threaded hole 34 is formed in the outboard surface of the locking retainer 24. As shown in FIG. 5, the hole halves 28 and 29 are circumferentially aligned so that when the closure piece 30 is placed into the entry slot 18, its inboard surface mates with the outboard surface of the locking retainer 24 and the two hole halves 28 and the two hole halves 29 combined to form two complete threaded, axially oriented holes 34.

Figure 6:
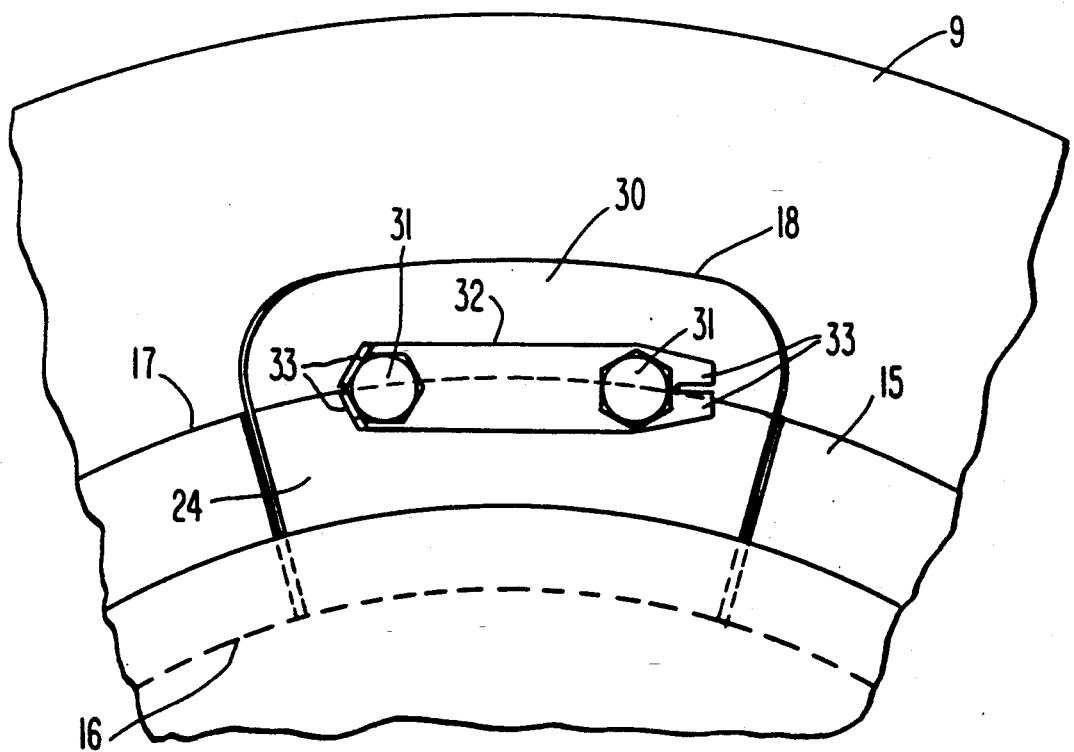
FIG. 6 is a view taken from line VI—VI shown in FIG. 5.

As shown in FIGS. 5 and 6, an axially oriented screw 31 is threaded into each of the holes 34, thereby affixing the closure piece 30 to the locking retainer 24. Thus, the locking retainer 24 prevents the closure piece 30 from moving axially out of the entry slot 1 and the closure piece prevents the locking retainer from moving radially and circumferentially in the grooves 16 and 17. Since, as previously discussed, the retainers 15 and 24 fill the entire 360° expanse of the grooves 16 and 17, locking the locking retainer 24 circumferentially in place locks all of the remaining retainers 15 circumferentially in place as well. This arrangement provides the positive locking associated with a locking screw without introducing the stress concentration associated with a threaded hole into either the shaft 8 or disc 9, both of which are highly stressed members.

As shown in FIGS. 5 and 6, the screws 31 are locked in place—that is, prevented from rotating—by a pant leg washer 32 retained by the screws. Note that for clarity, FIG. 6 shows the tabs 33 at one end of the pant leg washer 32 as they appear when the washer is originally installed and the tabs at the other end of the washer as they appear after the tabs have been bent around the sides of the hex head of the screw 31. However, it should be understood that the tabs 33 at both ends of the pant leg washer 32 are bent around the heads of screws 31 so that both screws are retained.

The current invention may be retro-fitted into existing rotors 3 by first unshrinking the dummy disc 9 from the shaft 8—for example, by simultaneously heating the disc and cooling the shaft. The groove 16 is then machined in the outer surface 14 of the shaft 8. Next, the disc 9 is shrunk back on the shaft 8—for example, by again simultaneously heating the disc and cooling the shaft—and the groove 17 and entry slot 18 are machined in the face 22 of the disc 9 at its hub 10. Alternatively, the groove 17 and entry slot 18 could be machined into the disc 9 prior to re-shrinking it onto the shaft 8.

After the machining is completed, the retainers 15 are inserted into the entry slot 18 one at a time and slid around the grooves 16 and 17. When the grooves 16, 17 are filled except for the portion inboard of the entry slot 18, the locking retainer 24 is inserted into the entry slot, followed by the closure piece 30. The holes 34 are then drilled between the closure piece 30 and the locking retainer 24 so that the centerline of the hole 34 lies on the intersection of the mating surfaces of the closure piece 30 and locking retainer 24. The holes 34 are then tapped. Alternatively, the holes 34 could be drilled and tapped prior to installing the closure piece 30 and locking retainer 24 by clamping the closure piece against the locking retainer—for example, in a vice.

After the closure piece 30 and locking retainer 24 are in place, the pant leg washer 32 is applied against the radial faces of the closure piece and locking retainer and the locking screws 31 are threaded into the holes 34, thereby locking the closure piece to the locking retainer and securing the pant leg washer. After the locking screws 31 are tightened, the tabs 33 of the pant leg washer 32 are bent around the sides of the hex head of the locking screws, as shown at one end of the pant leg washer 32 in FIG. 6.

Although a screw 31 has been shown for the locking device, those skilled in the art will appreciate that many other methods may be used for locking, such as a pin, snap ring, tongue and groove arrangement or welding. Moreover, although the invention has been described by reference to its application to a dummy disc in a steam turbine, it should be appreciated that the invention is equally applicable to bladed steam turbine discs which are not integral with the shaft, as well as to discs in other types of turbo-machines, such as compressors, pumps and gas turbines. In addition, although the grooves 16 and 17 have been depicted as extending 360° around the disc 9 and the shaft 8, grooves encompassing a lesser arc can also be utilized. Thus, the present invention may be embodied in other specific forms without departing from the spirit or essential attributes thereof and, accordingly, reference should be made to the appended claims, rather than to the foregoing specification, as indicating the scope of the invention.

We claim:

1. A steam turbine comprising:
   a) a casing in which a plurality of stationary vanes are disposed;
   b) a centrally disposed rotor enclosed by said casing, said rotor having a shaft and a plurality of blades, said shaft having a first circumferentially extending groove formed in the periphery thereof;
   c) a disc having a hub encircling said shaft in the vicinity of said first groove, a second circumferentially extending groove formed in said hub, a retainer entry slot formed on said second groove;
   d) an arcuate retainer for preventing axial motion of said disc relative to said shaft, said retainer having a first portion disposed in said first groove and a second portion disposed in said second groove, the combined radial height of said entry slot and said second groove being at least as great as the radial height of said retainer; and
   e) a closure piece disposed in said entry slot for preventing radial motion of said retainer within said first and second grooves.

2. A steam turbine comprising:
   a) a casing in which a plurality of stationary vanes are disposed;
   b) a centrally disposed rotor enclosed by said casing, said rotor having a shaft and a plurality of blades, said shaft having a first circumferentially extending groove formed in the periphery thereof;
   c) a disc having a hub encircling said shaft in the vicinity of said first groove, a second circumferentially extending groove formed in said hub; and
   d) a first arcuate retainer and a plurality of additional arcuate retainers for preventing axial motion of said disc relative to said shaft, each of said retainers having a first portion disposed in aid first groove and a second portion disposed in said second groove.

3. The steam turbine according to claim 2, wherein said second portion of each of said retainers extends axially, and said first portion extends radially inward from said second portion.

4. The steam turbine according to claim 3 wherein said disc has a radially extending face, said second groove being formed in said face.

5. The steam turbine according to claim 4 wherein the combined arcs encompassed by all of said arcuate retainers are such that said retainers fill the entire circumferential extent of said first groove.

6. The steam turbine according to claim 5 wherein said first and second grooves extend 360°.

7. The stream turbine according to claim 6, further comprising means for preventing circumferential motion of said retainers within said first and second grooves.

8. The steam turbine according to claim 2 wherein a retainer entry slot is formed on said second groove, the combined radial height of said entry slot and said second groove being at least as great as the radial height of each of said retainers.

9. The steam turbine according to claim 8, further comprising a closure piece disposed in said entry slot for preventing circumferential motion of said retainers within said first and second grooves.

10. The steam turbine according to claim 9, further comprising means for preventing axial motion of said closure piece within said entry slot.

11. The steam turbine according to claim 9, wherein at least one of said retainers is a locking retainer and is disposed inboard of said entry slot, the combined radial height of said second portion of said locking retainer and said closure piece being substantially equal to the combined radial height of said entry slot and said second groove.

12. The steam turbine according to claim 9, further comprising a locking device disposed in said entry slot, and wherein one of said retainers is a locking retainer, said locking device engaging both said closure piece and said locking retainer.

13. The steam turbine according to claim 12, wherein a hole is formed between said closure piece and said locking retainer, a first portion of the circumference of said hole being formed in said closure piece and a second portion of the circumference of said hole being formed in said locking retainer, said locking device engaging said hole.

14. The steam turbine according to claim 13, wherein said locking device is a screw threaded into said hole.

15. In a rotor having a shaft and a disc, said disc having a radially extending face and a hub intersecting said face and encircling said shaft, an apparatus for preventing axial movement of said disc along said shaft, comprising:
   a) a first circumferentially extending groove formed in the periphery of said shaft;

b) a second circumferentially extending groove formed in said disc adjacent said intersection of said hub and said face;

c) an approximately L-shaped retainer, a first leg of said L-shape disposed in said first groove and a second leg of said L-shape disposed in said second groove, and d) a first axially oriented locking screw extending into said second groove.

16. The apparatus according to claim 15, further comprising a hole, only a portion of the circumference of said hole being formed in said retainer, said locking screw being disposed in said hole.

17. The apparatus according to claim 15, further comprising a closure piece disposed in said second groove adjacent said retainer, only a portion of the circumference of said hole formed in said closure piece, said looking screw being disposed in said hole.

18. The apparatus according to claim 15, further comprising a closure piece, and wherein said locking screw is adapted to prevent relative axial motion between said retainer and said closure piece.

19. The apparatus according to claim 15, further comprising:

a) second axially oriented locking screw extending into said second groove; and b) means for preventing rotation of said first locking screw, said screw rotation preventing means retained by said second locking screw.

20. In a rotor having a shaft and a disc, said disc having a radially extending face and a hub encircling said shaft, a method of attaching said disc to said shaft, comprising the steps of:

a) machining a first circumferentially extending groove in the periphery of said shaft;

b) machining a second circumferentially extending groove in said disc face adjacent said hub;

c) machining an entry slot in said disc face adjacent said second groove;

d) shrinking said disc hub onto said shaft;

e) inserting a plurality of arcuate retainers having first and second portions into said entry slot so that said first portion is disposed in said first groove and said second portion is disposed in said second groove; and f) sliding each of said retainers around said first and second grooves so that said retainers fill the circumferential extent of said first and second grooves.

21. The method according to claim 20 wherein said disc hub is shrunk onto said shaft after said machining of said first groove but before said machining of said second groove.

22. The method according to claim 20 wherein said disc hub is shrunk onto said shaft after said machining of said first and second grooves.

23. The method according to claim 20 further comprising the steps:

a) inserting a closure piece into said entry slot adjacent the last one of said retainers inserted into said entry slot;

b) drilling a hole between said closure piece and last retainer, whereby a first portion of the circumference of said hole is formed in said closure piece and a second portion of the circumference of said hole is formed in said last retainer;

c) tapping said hole; and d) threading a locking screw into said hole.

* * * * *